Feb. 28, 1933.    L. D. WOODRUFF    1,899,785
GASKET HOLDING MEANS
Filed Feb. 21, 1929
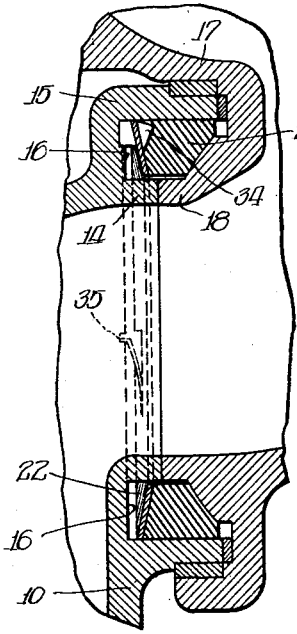
Fig. 1
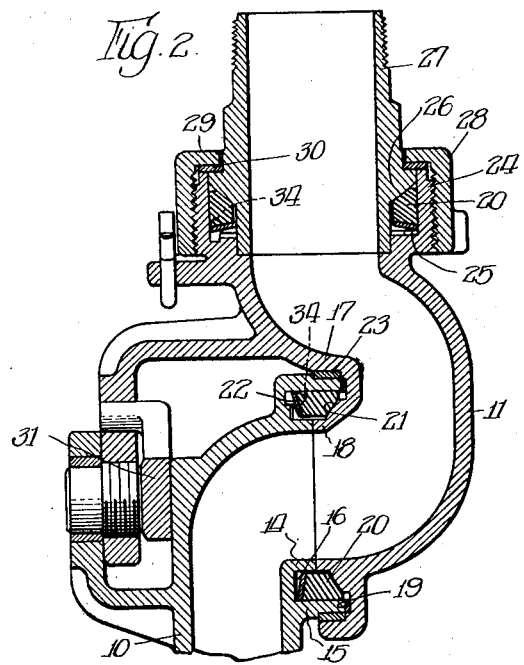
Fig. 2
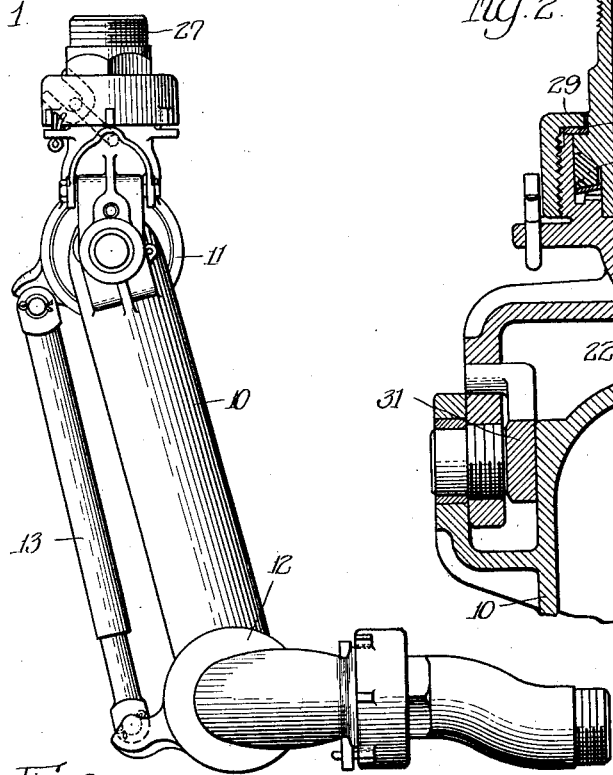
Fig. 3
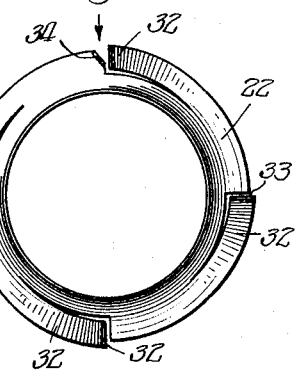
Fig. 4
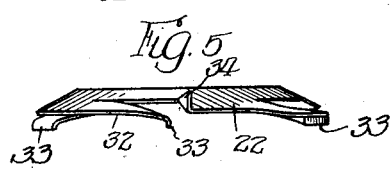
Fig. 5
Fig. 6
Inventor.
Leonidas D. Woodruff,
By Wilkinson, Huxley, Byron + Knight Patented Feb. 28, 1933

1,899,785

UNITED STATES PATENT OFFICE

LEONIDAS D. WOODRUFF, OF CHICAGO, ILLINOIS, ASSIGNOR TO HARRIS TRUST & SAVINGS BANK, TRUSTEE, OF CHICAGO, ILLINOIS, A CORPORATION OF ILLINOIS

GASKET HOLDING MEANS

Application filed February 21, 1929. Serial No. 341,621.

The present invention relates to gasket holding means for a swivel pipe joint.

More particularly the present invention relates to means for preventing undesirable rotation of the gasket within its holding member when said gasket is used to seal members having rotation relative to one another. The present invention is particularly useful in and will be described with reference to holding means for holding gaskets used in steam line connectors for railway trains, though it will be clear as the description proceeds that the invention has a much broader application.

In certain steam line connectors for railway trains hose castings are connected up through sleeves rotatable relative to said hose castings for the purpose of connecting together the steam lines of adjacent cars of a train or the locomotive of a train and an adjacent car. The joints between the hose castings and the cooperating sleeves have been sealed by means of gaskets. According to prior practice the gaskets have had a destructive rotative action relative to the members in which they were housed, resulting in the peripheral wearing away of said gaskets, whereby the life thereof has been relatively short.

An object of the present invention is to provide holding means for a gasket which will result in lengthening the life of said gasket.

A further object is to provide holding means for a gasket, which holding means is simple, which is well adapted to the needs of commercial service, and which will confine the wearing action of the gasket to the seat, which is well adapted to bear such action.

A further object is to provide holding means for a gasket adaptable for steam line connections, which is readily applicable to such connections as now appear in service, and which will cut down the wear to which gaskets have heretofore been subjected in service.

A further object is to provide a combined gasket holding means and spring seat plate whereby, while decreasing the number of parts which have heretofore been used in steam line connections the action of the gasket is improved.

Further objects will appear as the description proceeds.

Referring to the drawing—

Figure 1 is a view in side elevation of a few of the elements making up a train line connection;

Figure 2 is a sectional view, on an enlarged scale, showing a portion of a hose casting, the coupling sleeve cooperating with one extremity of said hose casting, a nipple, a threaded sleeve cooperating with said coupling sleeve and said nipple gaskets, and holding means for said gaskets, which holding means embody the principles of the present invention;

Figure 3 is a view on an enlarged scale of part of the structure shown in Figure 2;

Figure 4 is a plan view of a holding member embodying the principles of the present invention;

Figure 5 is a side view of the structure shown in Figure 4, Figure 5 being taken in the direction of the arrow in Figure 4; and Figure 6 is a view similar to Figure 3, on a reduced scale, and showing a modification of the present invention.

The illustrative structure includes the intermediate swinging hose casting 10, whose ends communicate with passages in connecting members forming part of a train line for carrying steam, air, or other fluid. The upper extremity of the hose casting 10 is shown in cooperation with the coupling sleeve 11 and the lower extremity of said hose casting 10 is shown in cooperation with the coupling sleeve 12. The hose casting 10 is connected to the coupling sleeves 11 and 12 through swivel connections, which will be referred to more in detail presently. Preferably, the coupling sleeves 11 and 12 are connected together through the telescoping member 13, pivotally connected at its upper end to the coupling sleeve 11 and at its lower end to the coupling sleeve 12. According to a construction shown, described and claimed in my copending application Serial No. 263,495, filed March 21, 1928, the telescoping member 13 is variable in length, being controlled by a spring (not shown). The function of the telescoping member 13, it will be understood without further explanation, is to prevent the coupler head from dragging along the track when the cars are uncoupled.

Referring to Figure 2, it will be noted that the illustrated extremity of the hose casting 10 is provided with a pair of annular walls 14 and 15, which provide between them an annular socket 16. The cooperating coupling sleeve 11 is provided with a corresponding pair of annular walls 17 and 18, which provide the annular socket 19. The walls 14 and 18 have corresponding dimensions, but the annular wall 15 of the hose casting 10 is shown as disposed within the socket 19 of the coupling sleeve 11. Disposed within and contacting with the wall 15 of the hose casting 10 is the gasket or packing material 20. Said gasket 20 has the seat 21 within the socket 19 of the coupling sleeve 11, the nipple portion of said member 11 being formed with an external beveled shoulder providing said seat. In the illustrated embodiment of the present invention said seat 21 is represented as being conical, though it will be understood that any other contour of seat may be chosen if preferred. The gasket 20 is held against its seat, according to the preferred embodiment of the present invention, by means of a combined holding member and resilient gasket seating plate, indicated as a whole by the numeral 22. Disposed between the wall 17 of the coupling sleeve 11 and the wall 15 of the hose casting 10 is a bushing 23.

The coupling sleeve 11 is provided at its upper extremity with the annular wall 24, which may be externally screwthreaded. Disposed inwardly of the wall 24 is the seat 25, which is adapted to carry a combined holding member and resilient gasket seating plate 22 for cooperation with a gasket or packing material 20, which gasket 20 is disposed within and is adapted to tightly engage said wall 24. The last mentioned gasket 20 cooperates with a corresponding surface, indicated by the numeral 26, forming part of the nipple 27, which nipple is externally screw-threaded for connection in the train line.

The nipple 27 is rotatably held in cooperation with the gasket 20 by means of the threaded sleeve 28, said sleeve 28 being provided with the annular shoulder 29, which through the medium of a bushing 30 takes the end thrust between said nipple 27 and the coupling sleeve 11.

The connections at the lower end of the hose casting 10 will be clear from the description of the connections at the upper end thereof. The numeral 31 indicates a wedge-lock, cooperating with other parts to secure the conduit members 10 and 11 in their swivel-jointed relationship, as shown, described and claimed in my copending application, Serial No. 238,141, filed December 6, 1927.

Referring now to a description of the combined holding member and resilient gasket seating plate 22, it will be noted that said member comprises a ring provided with radial incisions extending inwardly from the external periphery thereof and circumferential incisions extending from the inner extremities of said radial notches for a short distance, providing spring tongues 32—32. According to Figure 4, four of said spring tongues 32—32 are provided, all sprung from the same side of the member 22. The member 22 is illustrated as being conical in its shape, though it may take other forms if preferred. It will be noted that the extremities of the cantilever spring tongues 32—32 are provided at their extremities with the down struck ends 33. Said member 22, on the opposite side from the tongues 32—32, is provided with the upstanding prong 34. As will be clear from an inspection of Figures 3 and 5 each of the ends 33—33 is adapted to seat itself within a corresponding recess 35 in the hose casting 10. The prong 34 is adapted to dig into the material of the gasket 20. The net effect of the disposal of the end portions 33 within the notches 35 and the digging of the prong 34 into the gasket 20 is to prevent relative rotation between said gasket 20 and the member which encloses it; that is to say, referring to the lower gasket 20 in Figure 2, relative rotation is prevented between said gasket 20 and the hose casting 10, and, referring to the upper gasket 20 in Figure 2, relative rotation is prevented between said gasket 20 and the coupling sleeve 11. The net result is that as rotation or swivelling action occurs between the hose casting 10 and the coupling sleeve 11, practically the sole wearing action upon the gasket 20 will occur between the seat 21 and said gasket 20. Wearing action upon the periphery of the gasket 20 will be prevented and the life of the gasket will be greatly prolonged over prior practice. Similarly, when rotation or swivelling action occurs between the nipple 27 and the coupling sleeve 11, practically the entire wearing action upon the gasket 20 will occur at the region where said gasket engages the seat 26, wearing action upon the periphery of said gasket being prevented by reason of the fact that relative rotation between said gasket and its enclosing wall 24 is prevented.

Referring now to the modification shown in Figure 6, the numeral 36 indicates a gasket seating plate and the numeral 37 indicates a spring cooperating with said plate 36 and a gasket 20. Said spring 37 is a coil spring and has one extremity struck out, as indicated by the numeral 38, seated within a corresponding recess in the member which encloses said gasket 20. Said recess for receiving the extremity 38 of the spring 37 is disposed within the socket 16 of the hose casting 10. (Fig. 6.) The other extremity of the spring 37 is indicated by the numeral 39. Said last mentioned extremity is bent reversely from the extremity 38 and is adapted to extend through a corresponding aperture in the plate 36 and to dig into the gasket 20. Said spring 37, inasmuch as it is secured against rotation relative to the hose casting 10, will effectually prevent rotation of the gasket 20 relative to said hose casting 10, whereby wearing action upon the periphery of said casting 20 will be effectually prevented.

The present invention provides the advantage that the gasket is resiliently held to its seat, and the further advantage that peripheral wearing action between the gasket and the member within which it is located is prevented. According to the prefered embodiment shown in Figures 1 to 5 inclusive, the spring means, the gasket seating plate, and the means for preventing the rotation referred to are embodied in a unitary member.

Though certain embodiments of the present invention have been described in detail, many modifications will occur to those skilled in the art. It is intended to cover all such modifications that fall within the scope of the appended claims.

Notice is given that the train-pipe connector and joints thereof herein disclosed are subjects-matter claimed in my said application Serial No. 238,141, and that a connector having a spring device represented by the telescopic rod 13 for yieldingly supporting or upholding the lower end of the connector is subject-matter claimed in my said application, Ser. No. 263,495.

What is claimed is—

1. In combination, two cooperating conduit members capable of relative rotation, an annular gasket for preventing leakage between said members, said gasket being within and having engagement peripherally with one of said members, and spring means reacting between said one member and said gasket for preventing relative rotation between said one member and said gasket.

2. In combination, a holding member having an annular wall, a gasket within said annular wall and engaging peripherally therewith, and a spring member between the rear face of said gasket and said holding member, said spring member pressing said gasket forwardly and having portions cooperating with said holding member and said gasket member to prevent relative rotation therebetween.

3. In combination, a supporting member including an annular wall, a gasket disposed within said wall, and a spring between the rear face of said supporting member and said gasket, said spring pressing said gasket forwardly and having portions engaging said supporting member and said gasket for preventing relative rotation therebetween.

4. In combination, a pair of members adapted to have rotation relative to one another, one of said members including an annular wall, a gasket within said wall, the other of said members having a surface engaging one side of said gasket, and a spring member disposed between said one member and the other side of said gasket, said spring member being provided with means for preventing relative rotation between said one member and said gasket.

5. In combination, a pair of members adapted to have rotation relative to one another, one of said members including an annular wall, a gasket within said wall, the other of said members having a surface engaging one side of said gasket, and a spring member disposed between said one member and the other side of said gasket, said spring member being provided with means for preventing relative rotation between said one member and said gasket, said spring member including a gasket seating plate providing a bearing surface for said gasket.

6. In combination, a pair of members adapted to have rotation relative to one another, one of said members including an annular wall, a gasket within said annular wall, the other of said members having rotary bearing relationship with one side of said gasket, and a combined resilient gasket seating plate and gasket holding member engaging the other side of said gasket, said combined spring plate and holding member being provided with means for preventing rotation between said gasket and said one member.

7. In combination, a pair of members adapted to have rotation relative to each other, a gasket for seating said members relative to one another, one of said members having an annular wall adapted to receive the periphery of said gasket, the other of said members seating upon one side of said gasket, and a resilient plate having a broad bearing surface upon the other side of said gasket, said resilient plate having a portion engaging said gasket and a portion engaging said one member whereby to prevent relative rotation between said gasket and said annular wall.

Signed at Chicago, Illinois, this 18th day of February, 1929.

LEONIDAS D. WOODRUFF.